Fig. I
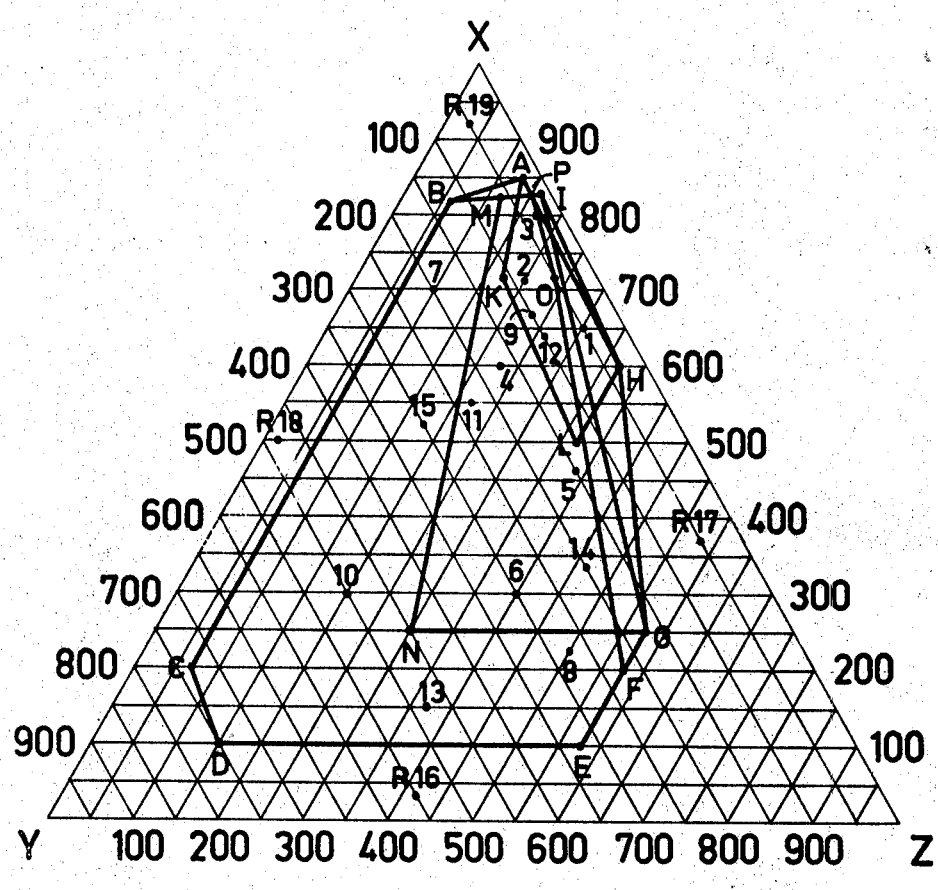

Fig. II
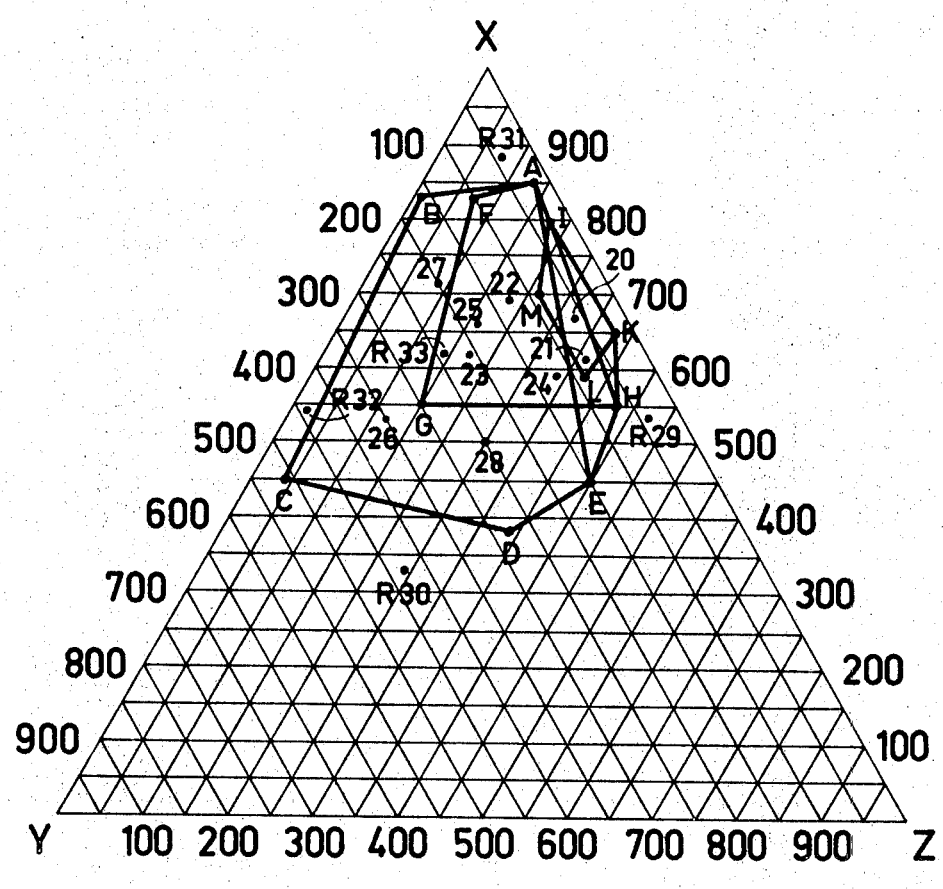

Fig. III
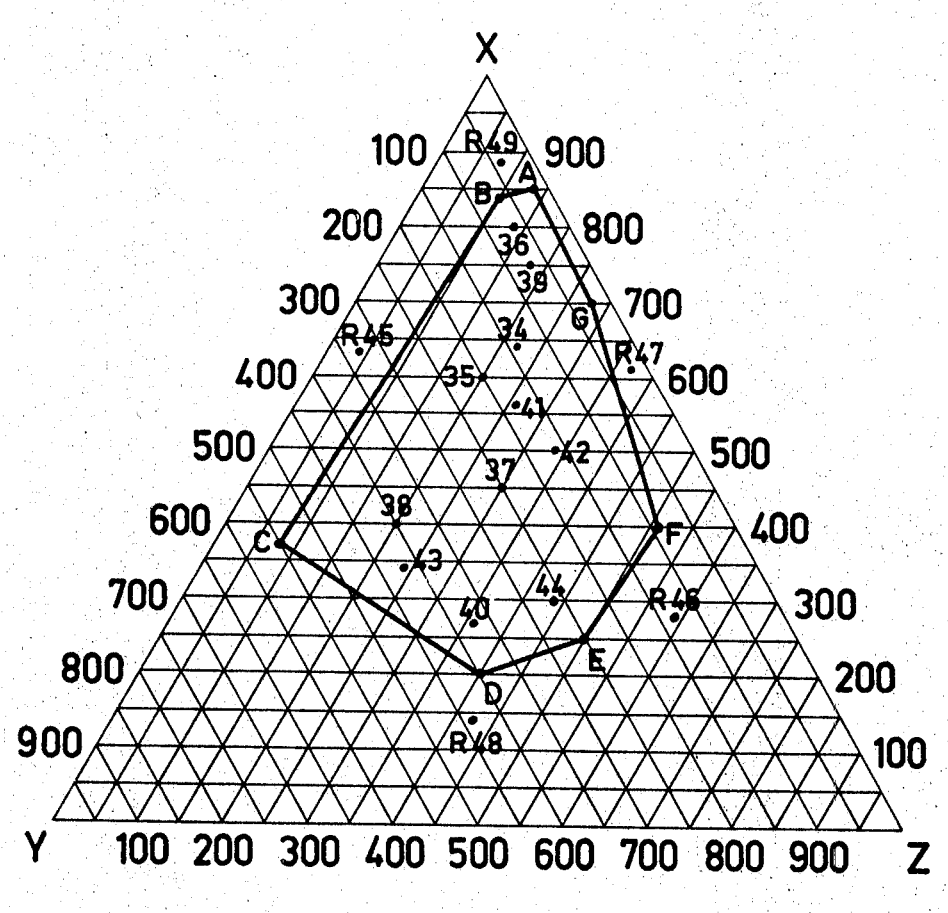

United States Patent Office 3,558,538
Patented Jan. 26, 1971

3,558,538
MASTIC COMPOSITIONS BASED ON ETHYLENE-PROPYLENE COPOLYMERS OR ON ETHYLENE-PROPYLENE-NON-CONJUGATED DIENE TERPOLYMERS
Friedrich Wollrab and Maurice Gerkens, Brussels, Belgium, assignors to Solvay et Cie Societe Anonyme, Brussels, Belgium, a Belgian corporation
Filed July 3, 1967, Ser. No. 650,697
Claims priority, application Belgium, July 13, 1966, 30,807; Jan. 16, 1967, 38,515; Mar. 2, 1967, 40,749; Mar. 16, 1967, 41,088
Int. Cl. C08f 37/00
U.S. Cl. 260—23
27 Claims

ABSTRACT OF THE DISCLOSURE

Non-hardening and surface hardening mastics are provided. The non-hardening mastics are composed of an elastomeric ethylene-propylene copolymer or ethylene-propylene-non-conjugated diene terpolymer, a mineral oil and a filler. The surface hardening mastics are additionally composed of a drying oil.

BACKGROUND OF THE INVENTION

The present invention relates to mastics containing elastomeric ethylene-propylene copolymers or ethylene-propylene-non-conjugated diene terpolymers and which can in particular be used in coachbuilding, i.e., the building of automobile bodies, and in the fields of metal construction and building.

The invention relates more particularly to mastic compositions which do not harden and mastic compositions which harden on the surface while remaining soft below the surface.

Up to the present time, most mastics used in the automobile industry have been prepared from diene rubbers. These mastics have disadvantages, particularly the disadvantage of hardening or drying on aging. This drying effect is actually due to oxidation by atmospheric oxygen of the double bonds of the diene rubber. In these circumstances, the mastics tend to crack or crackle.

The applicants have developed hydrophobic, thixotropic mastic compositions which have excellent plasticity and adhesiveity properties, as well as good resistance to aging.

SUMMARY OF THE INVENTION

The present invention relates to mastics composed of an elastomeric ethylene-propylene copolymer or ethylene-propylene-non-conjugated diene terpolymer, a filler material and a mineral oil, which mastics are non-hardening and to mastics additionally composed of a drying oil, which mastics are surface hardening.

BRIEF DESCRIPTION OF THE DRAWINGS

In the drawings, FIGS. I, II and III are ternary composition diagrams or plots, in the conventional form for such diagrams or plots of equilateral triangles, defining compositions according to the invention. With respect to each of the diagrams or plots, the scale of each axis (side of the triangle) is 0 to 1000, 1000 corresponding to each of the apices X, Y and Z of the triangles and representing 100.0%, by weight, 500 representing 50.0%, by weight, etc., of the particular component which the particular axis represents.

DESCRIPTION OF THE PREFERRED EMBODIMENTS

The invention relates more particularly, in one of its aspects, to non-hardening mastic compositions composed of ethylene-propylene copolymers having an intrinsic viscosity, measured at 120° C. in xylene, of from 0.1 to 0.6 l./g., a filler material, and a mineral oil in proportions the limits of which are defined by the area ABCDEFGHI of the diagram of FIG. I. In this diagram the points X, Y, and Z represent respectively 100% of the filler material, copolymer, and mineral oil.

All ethylene-propylene copolymers having an intrinsic viscosity measured at 120° C. in xylene of from 0.1 to 0.6 l./g. can be used for the preparation of the mastics according to the embodiment of the invention of FIG. I. However, mastics having further improved properties are obtained by the use of ethylene-propylene copolymers having intrinsic viscosities in narrower ranges within this range.

In the case of ethylene-propylene copolymers having an intrinsic viscosity measured at 120° C. in xylene of from 0.1 to 0.3 l./g., the limits of the relative proportions of the various constituents suitable for the production of improved mastics are defined by the area ABCDEFOP of the diagram of FIG. I.

Another type of improved mastic is obtained from ethylene-propylene copolymers having an intrinsic viscosity from 0.3 to 0.5 l./g. In this case, the limits of the proportions of the ingredients are defined by the area MNGI of the diagram of FIG. I.

Still another type of improved mastic is that obtained from ethylene-propylene copolymers having an intrinsic viscosity from 0.5 to 0.6 l./g. The limits of the proportions of the various ingredients are then defined by the area AKLH in the diagram of FIG. I.

The present invention also relates to non-hardening mastic compositions composed of ethylene-propylene-non-conjugated diene terpolymers, a filler material, and a mineral oil in proportions the limits of which are defined by the area ABCDEFG of the diagram of FIG. III.

In this diagram the points X, Y, and Z represent respectively 100% of the filler material, terpolymer, and mineral oil.

The present invention further relates to surface hardening mastic compositions composed of:

(a) ethylene-propylene copolymers having an intrinsic viscosity measured at 120° C. in xylene of from 0.1 to 0.6 l./g.,
(b) a mixture comprising a mineral oil and a drying oil in a weight proportion of the mineral oil to the drying oil of from 99/1 to 1/4, preferably from 4/1 to 1/3, and
(c) a filler material defined by the area ABCDEHKI of the diagram of FIG. II.

In this diagram the points X, Y, and Z represent respectively 100% of the filler material, copolymer, and mixture of oils.

All the ethylene-propylene copolymers having an intrinsic viscosity measured at 120° C. in xylene of from 0.1 to 0.6 l./g. can be used to prepare mastics according to the embodiment of the invention of FIG. II. However, mastics having further improved properties are obtained by the use of ethylene-propylene copolymers having intrinsic viscosities in narrower ranges within this range.

In the case of copolymers having an intrinsic viscosity measured at 120° C. in xylene of from 0.1 to 0.3 l./g., the limits of the relative proportions of the various constituents suitable for preparing improved mastics are defined by the area ABCDE of the diagram of FIG. II.

Another type of improved mastics is obtained from ethylene-propylene copolymers having an intrinsic viscosity from 0.3 to 0.5 l./g. In this case the limits of the proportions of the ingredients are defined by the area AFGHI of FIG. II.

Still another type of improved mastics is that obtained from ethylene-propylene copolymers having an intrinsic viscosity from 0.5 to 0.6 l./g. The limits of the proportions of the various ingredients are then defined by the surface ILM of the diagram of FIG. II.

The present invention also relates to surface hardening mastic compositions composed of:

(a) an ethylene-propylene-non-conjugated diene terpolymer,
(b) a mixture comprising a mineral oil and a drying oil in a weight ratio of the mineral oil to the drying oil of from 99/1 to 1/4, preferably from 4/1 to 1/3, and
(c) a filler material, in proportions the limits of which are defined by the area ABCDEFG of the diagram of FIG. III.

In this case, the point Z represents 100% of the mixture of oils.

The proportions of the ethylene and the propylene in the copolymers and terpolymers are not critical provided that these are elastomers. However, the copolymers and terpolymers having a propylene content of from 25 to 75%, preferably 30 to 50%, molal, are more particularly suitable for producing mastics having the desired properties.

The non-conjugated dienes associated with ethylene and propylene in the terpolymers are preferably:

non-conjugated aliphatic dienes, such as pentadiene-1,4, hexadiene-1,4, and hexadiene-1,5;
non-conjugated monocyclic dienes, such as 4-vinyl-cyclohexene, 1,3 - divinylcyclohexane, cycloheptadiene-1,4, and cyclooctadiene-1,5;
non-conjugated alicyclic dienes having an endocyclic bridge, such as dicyclopentadiene and norbornadiene.

Particularly satisfactory terpolymers as elastomers utilizable for carrying out the invention are ethylene-propylene-dicyclopentadiene terpolymers and ethylene-propylene-hexadiene-1,4 terpolymers.

In any event, terpolymers having a Mooney viscosity at 100° C. of from 20 to 120 (ASTM test D 927/53 T) are preferred.

The expression filler material or "filler" is here understood to mean all fillers usually employed in previously known mastics, and in particular mention may be made of talc, chalk, kaolin, clay, carbon black, and asbestos.

The mineral oils which are utilized in the present invention are the conventional mineral oils.

Particularly advantageous naphthenic oils for carrying out the invention are the products sold in commerce under the names Circosol N.S. and Circo Light (Sun Oil Company). These are naphthenic oils having a low freezing point and having the characteristics listed in Table 1 below:

TABLE 1

| Properties | Oils | |
|---|---|---|
| | Circosol N.S. | Circo Light |
| Viscosity at 100° C., centistokes | 10.2 | 4.3 |
| Specific gravity at 15° C., kg./dm.³ | 0.928 | 0.924 |
| Flash point, ° C. | 202 | 166 |
| Freezing point, ° C. | −21 | −34 |
| Combustion point, ° C. | 229 | 188 |
| Mean molecular weight | 380 | 315 |

An example of an aromatic oil which may also be successfully used for carrying out the invention is the product sold in commerce under the name Sundex 8180 (Sun Oil Company). It has the following characteristics:

Viscosity at 100° C.: 37.9 centistokes
Specific gravity at 15° C.: 0.987 kg./dm.³
Flash point: 243° C.
Freezing point: 16° C.
Combustion point: 271° C.

It is also possible to use synthetic oils, such as liquid polybutenes and polyisobutenes, particularly the product sold in commerce under the name Indopol (Amoco Chemicals Corp.). In addition, part of the mineral or synthetic oil may be replaced by a plasticizer of the ester type, such as an adipate or a sebacate. Since the mineral and synthetic oils are equivalent materials in the present invention, the expression "mineral oil" as it appears in the specification and claims is to be deemed to include the synthetic oils. Moreover, since part of the oil may be replaced by a plasticizer as immediately hereinbefore referred to, which plasticizer augments the plasticizing action of the mineral oil, the expression "mineral oil" as it appears in the specification and claims is to be deemed further to include mineral oil and a hereinbefore referred to plasticizer conjunctively.

The expression "drying oil" is here used in its widest sense and includes all oils which, on exposure to air, absorb oxygen and dry with the formation of a solid substance. These are generally esters of unsaturated fatty acids.

The drying oils which are particularly suitable for preparing hardening mastics according to the invention include linseed oil, cod liver oil, and tall oil. Unsaturated mineral oils may likewise be used.

The weight ratio between the mineral oil and the drying oil is critical in the production of hardening mastics having the desired properties. This mineral oil/drying oil ratio must be from 99/1 to 1/4 and preferably from 4/1 to 1/3.

The replacement of the mineral oil by an excessive proportion of drying oil leads to the production of mastics having intolerable exudation due to the complete incompatibility of the drying oil with the ethylene-propylene copolymers and the ethylene-propylene-non-conjugated diene terpolymers. On the other hand, the use of compositions containing, in addition to the elastomer and the filler, a mixture of a mineral oil and a drying oil in the proportions defined above leads to the production of surface hardening mastics which remain soft on the inside and have excellent plasticity properties. Within the limits defined above, the various mixtures of mineral and drying oils are perfectly compatible with the ethylene-propylene copolymers and ethylene-propylene-non-conjugated diene terpolymers.

It is also possible to incorporate other ingredients in the mastic compositions of the invention, particularly resins such colophony, coumarone resins, non-reactive phenol-formaldehyde resins, such as the products sold in commerce under the name Amberol S.T. 137X (Rohm and Haas) and Bakelite 435 (Union Carbide), polyterpene resins, and similar resins.

The incorporation of the abovementioned resins at the rate of 1 to 20%, preferably 2 to 10%, by weight, based on the total weight of the resultant mastic, improves the adhesion properties of the mastics.

Although the non-hardening mastics according to the invention have excellent resistance to aging, this property may be further improved by adding anti-oxidizing compounds, such as substituted phenols. However, with regard to the preparation of surface hardening mastics, the incorporation of anti-oxidizing compounds should be avoided, because they excessively slow down the surface hardening. In this case, it is possible to add, if necessary, a hardening agent such as cobalt naphthenate at the rate of 1 g. per kg. of the drying oil. The presence of this agent reduces the hardening time by 30 to 50%.

The addition of small quantities of a mixture of glycerine and water facilitates the production of the mastics and considerably reduces adhesion to the walls of the mixing apparatus.

The mastic compositions according to the invention can be prepared by any conventional means known to those versed in the art, for example by malaxation in an arm type malaxator at a temperature of 20 to 100° C. It is also possible to operate by the following method:

(a) With the aid of a cylinder type malaxator or of an internal mixer, the ethylene-propylene copolymer is extended with a portion of the oils.

(b) The filler is formed separately into a paste by adding a portion of the oils until a paste can be collected, i.e., the minimum quantity of oils is added to the filler to obtain a paste without risk of subsequent exudation of oil. This operation can be carried out with the aid of a Hobart planetary mixer.

(c) The two products obtained as described above are then homogenized in a Brabender pastograph or in an arm type mixer, while the additional quantity of the oils necessary to bring the mastic to the desired consistency is added.

Another method of proceeding is as follows:

(a) With the aid of a sigmoid arm type malaxator a basic elastomer-oil mixture is made, the double jacket of the malaxator being heated so as to obtain a temperature of about 100° C. in the mass.

(b) The filler material is then incorporated in the basic mixture with the aid of a malaxator; this operation can be carried out in the hot or cold state.

When the mastic composition is to contain a resin as an additive, it is advisible preliminarily to heat the oil and to dissolve the resin in the hot oil.

The mastics according to the invention are hydrophobic and have great plasticity and excellent power of adhesion to smooth metal parts.

The non-hardening mastics of the inention have a firm consistency at rest, which is then reduced by trituration. In addition, these permanently plastic mastics have excellent creep resistance and, in particular, higher creep resistance than that of similar mastic compositions based on butyl rubber, for example.

Surface hardening mastics of the invention containing a drying oil have advantages over conventional mastics, such as glazier's putty based on chalk and linseed oil and diene rubber based mastics, which harden completely after a certain time. The surface hardening mastics of the invention in fact harden on the surface while remaining soft in the interior. This important property imparts to them a permanent plasticity enabling them in particular to follow small movements of constructional parts, particularly those due to variations of temperature.

The surface hardening mastic compositions defined in the diagrams of FIGS. II and III and situated in the right-hand portion of the above specified areas thereof are relatively soft and can be sprayed from a spray-gun without further addition of solvent. With regard to the surface hardening mastic compositions situated is the left-hand portion of these areas, the addition of a small quantity of a solvent, such as white spirit for example, enables them to be sprayed by means of a spray-gun. From 5 to 50 g. of solvent per kg. of mastic to be rendered sprayable is preferably added.

The above referred to areas of the diagrams of FIGS. I to III fix the limits of the mastic compositions. Outside these limits the mastics have various defects and in particular may be too liquid and too sticky, too resilient, badly bound (brittle), may be excessively stiff or give rise to intolerable exudation due to the incompatibility of the drying oil with the ethylene-propylene copolymers or ethylene-propylene-non-conjugated diene terpolymers.

Examples 1 to 19

Various non-hardening mastic compositions based on ethylene-propylene copolymers, a mineral oil, and a filler material, and also other mastic compositions given by way of comparison ($R_{16}$ to $R_{19}$) are prepared by malaxation in an arm type malaxator.

In these compositions use is preferably made of an oil low viscosity for the mastic compositions situated in the left-hand part of the above referred to areas and an oil of high viscosity for the mastic compositions situated in the right-hand part of the above referred to areas.

The various mastic compositions thus prepared and an evaluation of their properties are set forth in Table 2 below and the numbers of the examples refer to the corresponding points in the diagram of FIG. I.

TABLE 2

| Example | Ethylene-propylene copolymer | Mineral oil (a) | Mineral oil (b) | Mineral oil (c) | Filler Talc | Filler Chalk | Mole percent of propylene | Intrinsic viscosity at 120° C. in xylene, l./g. | Properties of mastic |
|---|---|---|---|---|---|---|---|---|---|
| 1 | 50 | 300 | | | 650 | | 33 | 0.57 | Very good. |
| 2 | 90 | | 200 | | | 710 | 33 | 0.57 | Good. |
| 3 | 30 | | | 170 | 800 | | 33 | 0.57 | Do. |
| 4 | 170 | | 230 | | | 600 | 38 | 0.38 | Do. |
| 5 | 150 | | | 390 | 460 | | 38 | 0.38 | Very good. |
| 6 | 300 | 400 | | | | 300 | 38 | 0.38 | Good. |
| 7 | 200 | | 100 | | | 700 | 45 | 0.17 | Do. |
| 8 | 270 | | | 500 | | 230 | 45 | 0.17 | Do. |
| 9 | 100 | | | 230 | 670 | | 45 | 0.17 | Very good. |
| 10 | 500 | 200 | | | | 300 | 45 | 0.17 | Good. |
| 11 | 230 | 220 | | | 550 | | 45 | 0.17 | Very good. |
| 12 | 100 | | | 260 | 640 | | 45 | 0.17 | Do. |
| 13 | 480 | | 370 | | | 150 | 45 | 0.17 | Good. |
| 14 | 200 | | | 470 | 330 | | 45 | 0.17 | Do. |
| 15 | 300 | | 180 | | 520 | | 45 | 0.17 | Do. |
| $R_{16}$ | 550 | 420 | | | 30 | | 45 | 0.17 | Too resilient. |
| $R_{17}$ | 50 | | 580 | | | 370 | 38 | 0.38 | Too liquid and too sticky. |
| $R_{18}$ | 480 | | 20 | | | 500 | 45 | 0.17 | Too stiff. |
| $R_{19}$ | 50 | 30 | | | 920 | | 33 | 0.57 | Badly bound, brittle. |

NOTE.—(a) Circosol N.S. (naphthenic mineral oil of the Sun Oil Co.); (b) Circo Light (naphthenic mineral oil of the Sun Oil Co.); (c) Sundex 8180 (aromatic mineral oil of the Sun Oil Co.).

Examination of Table 2 and of the diagram of FIG. I clearly shows that the satisfactory mastic compositions fall within the area of the diagram of FIG. I defining the invention and also that the most satisfactory mastic compositions fall within the above referred to preferential areas of FIG. I varying in accordance with the viscosity of the ethylene-propylene copolymers.

The favorable influence of the proper selection of the viscosity of the oils used is also observed. Mastics are obtained which have improved properties for the different fields of utilization mentioned above by judiciously selecting the ethylene-propylene copolymers and the mineral oil according to the invention, particularly their viscosity. The addition of a high viscosity mineral oil tends to reduce fluidity and the adhesion of the mastic, while the use of a low viscosity oil reduces its stiffness. Since a high solids content mastic will tend to be too stiff and a low solids content mastic will tend to be too fluid and sticky, to counteract these tendencies, it is preferred to employ a relatively low viscosity mineral oil in a high solids content mastic and a relatively high viscosity mineral oil in a low solids content mastic, the magnitude of the viscosity of the mineral oil, therefore, preferably being inversely proportional to the solids content, the solids content being the content of constituents which individually are solids, i.e., primarily the copolymer or terpolymer and the filler.

Examples 20 to 33

Various surface hardening mastic compositions based on ethylene-propylene copolymers, a filler material, and a mixture of a mineral oil and a drying oil, and also other mastic compositions given by way of comparison ($R_{29}$ to $R_{33}$) are prepared by malaxation in an arm type malaxator.

The various mastic compositions thus prepared and an evaluation of their properties are set forth in Table 3 below and the numbers of the examples refer to the corresponding points in the diagram of FIG. II.

ther addition of solvent. On the other hand, the addition of small quantities of solvent, such as white spirit, permits the spraying of the mastic compositions situated in the left-hand part of the above referred to areas (Example 26).

Examples 34 to 49

Various non-hardening and hardening mastic compositions based on ethylene-propylene-non-conjugated diene terpolymers, a filler material, a mineral oil, and optionally a drying oil, and also other mastic compositions given by way of comparison ($R_{45}$ to $R_{49}$) are prepared by malaxation in an arm type malaxator.

The various mastic compositions thus prepared and an evaluation of their properties are set forth in Table 5 below and the numbers of the examples refer to the corresponding points in the diagram of FIG. III.

The terpolymers used are well known to those versed in the art and are sold in commerce under the names of Nordel 1040 (Du Pont), Enjay 4504 (Enjay), and Royalene 200 (U.S. Rubber). They have the characteristics set forth in Table 4 below:

TABLE 3

| | Composition, g. | | | | | Characteristics of ethylenepropylene copolymer | | |
|---|---|---|---|---|---|---|---|---|
| | Ethylene-propylene copolymer | Mineral oil | | Drying oil | | Filler, Chalk | Mole percent of propylene | Intrinsic viscosity at 120° C. in xylene, l./g. | Properties of mastic |
| | | (a) | (b) | (c) | (d) | | | | |
| Example: | | | | | | | | | |
| 20 | 60 | 180 | | 90 | | 670 | 33 | 0.57 | Very good. |
| 21 | 80 | | 250 | 60 | | 610 | 33 | 0.57 | Good. |
| 22 | 130 | 90 | | 90 | | 690 | 38 | 0.38 | Very good. |
| 23 | 210 | | 120 | | 50 | 620 | 38 | 0.38 | Do. |
| 24 | 120 | 260 | | 30 | | 590 | 38 | 0.38 | Good. |
| 25 | 180 | | 80 | 80 | | 660 | 45 | 0.17 | Very good. |
| 26* | 350 | 60 | | | 60 | 530 | 45 | 0.17 | Do. |
| 27 | 200 | 30 | | 60 | | 710 | 45 | 0.17 | Good. |
| 28 | 250 | 125 | | 125 | | 500 | 45 | 0.17 | Do. |
| $R_{29}$ | 40 | | 300 | 130 | | 530 | 38 | 0.38 | Too liquid and too sticky. |
| $R_{30}$ | 430 | 120 | | 120 | | 330 | 45 | 0.17 | Too resilient. |
| $R_{31}$ | 40 | | 60 | 20 | | 880 | 33 | 0.57 | Badly bound, brittle. |
| $R_{32}$ | 440 | 10 | | | 10 | 540 | 45 | 0.17 | Too stiff. |
| $R_{33}$ | 240 | | 20 | 120 | | 620 | 38 | 0.38 | Bad (exudation of linseed oil). |

Examination of Table 3 and of the diagram of FIG. II clearly shows that the satisfactory mastic compositions fall within the area of the diagram of FIG. II defining the invention and also that the most satisfactory mastic compositions fall within the above referred to preferential areas of FIG. II varying in accordance with the viscosity of the ethylene-propylene copolymers.

The mastic compositions situated in the right-hand part of the above referred to areas have a sufficiently soft consistency to be sprayed with a spray-gun without fur-

TABLE 4

| | Terpolymer | | |
|---|---|---|---|
| | I | II | III |
| Properties | Nordel 1040 | Enjay 4504 | Royalene 200 |
| Unsaturation, groups g./kg. | 0.58 | 0.54 | 0.3 |
| Propylene content, mole percent | 36 | 36 | 32 |
| Mooney ML viscosity at 100° C. in accordance with the standard ASTM D 927/53 T | 53 | 41 | 95 |

TABLE 5

| | Composition, g. | | | | | | | | Properties of mastic | |
|---|---|---|---|---|---|---|---|---|---|---|
| | Terpolymer | | | Mineral oil | | | Drying oil | | | |
| | I | II | III | (a) | (b) | (c) | (d) | (e) | Chalk (filler) | Nature | Quality |
| Example: | | | | | | | | | | | |
| 34 | | | 140 | | 220 | | | | 640 | Non-hardening | Very good. |
| 35 | 200 | | | | 70 | | 130 | | 600 | Hardening | Do. |
| 36 | | | 60 | | | 50 | | 90 | 800 | do | Good. |
| 37 | | 250 | | | 150 | | 150 | | 450 | do | Very good. |
| 38 | 400 | | | | | 100 | | 100 | 400 | do | Do. |
| 39 | | 70 | | 90 | | | 90 | | 750 | do | Good. |
| 40* | 370 | | | | 180 | | 180 | | 270 | do | Do. |
| 41 | | 150 | | 70 | | | | 130 | 650 | do | Very good. |
| 42 | 160 | | | 340 | | | | | 500 | Non-hardening | Do. |
| 43 | | 420 | | | 240 | | | | 340 | do | Good. |
| 44 | | 260 | | | | | 440 | | 300 | do | Very good. |
| $R_{45}$ | 330 | | | | 40 | | | | 630 | do | Too stiff. |
| $R_{46}$ | | 130 | | | | 100 | | 490 | 280 | Hardening | Exudation intolerable. |
| $R_{47}$ | 20 | | | | 370 | | | | 610 | Non-hardening | Too liquid. |
| $R_{48}$ | | 440 | | 210 | | | 210 | | 140 | Hardening | Too sensitive. |
| $R_{49}$ | 40 | | | | 50 | | | 20 | 890 | do | Badly bound brittle. |

*Mastic to which was added 50 g. of white spirit per kg. of mastic.

NOTE.—(a) Circosol N.S. (naphthenic mineral oil of the Sun Oil Co.); (b) Circo Light (naphthenic mineral oil of the Sun Oil Co.); (c) Sundex 8180 (aromatic mineral oil of the Sun Oil Co.); (d) Linseed oil; (e) Cod liver oil.

Examination of Table 5 and of the diagram of FIG. III clearly shows that the satisfactory mastic compositions fall within the area of the diagram of FIG. III defining the invention.

With regard to surface hardening mastic compositions situated in the right-hand part of the above referred to area, these have a sufficiently soft consistency to be sprayed by means of a spray-gun without further addition of solvent. On the other hand, the addition of quantities varying from 5 to 50 g., per kg. of mastic, of a solvent such as white spirit permits the spraying of the surface hardening mastic compositions situated in the left-hand part of the area.

Examples 50 to 59

By malaxation in an arm type malaxator mastic compositions similar to those described in the preceeding examples are prepared, as well as others, to serve as comparison, in which the ethylene-propylene copolymers and the ethylene-propylene non-conjugated diene terpolymers are replaced by a butyl rubber sold commercially under the name Polysar Butyl (Polysar Limited Sarnia).

The creep resistance is measured by an accelerated test consisting in forming from the mastics quadrilateral pyramids having a base of 25 x 25 mm. and a height of 50 mm. These pyramids are placed in an oven at 50° C. and the reduction of their height in the course of time, particularly after 1 hour, 3 hours, and 24 hours, is observed. The mastic compositions and the results of the creep tests are set forth in Table 6 below.

The results of these tests clearly illustrate the superiority of the mastics of the invention over a mastic based on butyl rubber.

claim 3 in which the proportion of propylene in the terpolymer is about 30 to 50 mole percent.

5. Surface hardening mastic compositions comprising an elastomeric terpolymer of ethylene, propylene and a non-conjugated diene having a propylene content of 25 to 75 mole percent, a filler and an oil comprised of a mineral oil and a drying oil in a weight ratio of mineral oil to drying oil between 99:1 and 1:4.

6. Surface hardening mastic compositions according to claim 5 in which the proportion of propylene in the terpolymer is about 30 to 50 mole percent.

7. Mastic composition according to claim 1, in which said copolymer, said filler and said mineral oil are present in proportions defined by the area (ABCDEFGHI) in the diagram of FIG. I, said mastic compositions being non-hardening.

8. Mastic compositions according to claim 7, in which said ethylene-propylene copolymer has an intrinsic viscosity, measured at 120° C. in xylene, of from 0.1 to 0.3 l./g. and in which said copolymer, said filler and said oil are present in proportions defined by the area (ABCDEFOP) in the diagram of FIG. I.

9. Mastic compositions according to claim 7, in which said ethylene-propylene copolymer has an intrinsic viscosity, measured at 120° C. in xylene, of from 0.3 to 0.5 l./g. and in which said copolymer, said filler and said oil are present in porportions defined by the area (MNGI) in the diagram of FIG. I.

10. Mastic compositions according to claim 7, in which said ethylene-propylene copolymer has an intrinsic viscosity, measured at 120° C. in xylene, of from 0.5 to 0.6 l./g. and in which said copolymer, said filler and said

TABLE 6

| Composition, g. | Examples | | | | | | | | | |
|---|---|---|---|---|---|---|---|---|---|---|
| | R$_{50}$ | R$_{51}$ | 52 | 53 | 54 | R$_{55}$ | R$_{56}$ | 57 | 58 | 59 |
| Ethylene-propylene copolymer containing 47 mole percent of propylene | | | 100 | | | | | 100 | | |
| Ethylene-propylene copolymer containing 51 mole percent of propylene | | | | 100 | | | | | 100 | |
| Royalene 200 [a] | | | | | 100 | | | | | 100 |
| Polysar Butyl 100 [b] | 100 | | | | | 100 | | | | |
| Polysar Butyl 400 [b] | | 100 | | | | | 100 | | | |
| Circo Light mineral oil | 200 | 200 | 200 | 200 | 200 | | | | | |
| Indopol H 100 [c] | | | | | | 35 | 35 | 35 | 35 | 35 |
| Indopol L 10 [c] | | | | | | 35 | 35 | 35 | 35 | 35 |
| Kaolin | | | | | | 17.5 | 17.5 | 17.5 | 17.5 | 17.5 |
| Chalk | 700 | 700 | 700 | 700 | 770 | | | | | |
| Carbon black | | | | | | 65 | 65 | 65 | 65 | 65 |
| Schenectady ST-5115 [d] | | | | | | 17.5 | 17.5 | 17.5 | 17.5 | 17.5 |
| Height of pyramid, mm., creep time: | | | | | | | | | | |
| 1 hr | 18 | 25 | 45 | 37 | 35 | 40 | 40 | 45 | 40 | 46 |
| 3 hr | 18 | 23 | 42 | 35 | 32 | 20 | 27 | 42 | 40 | 42 |
| 24 hr | 17 | 21 | 39 | 35 | 31 | 15 | 15 | 40 | 40 | 34 |

[a] Ethylene-propylene-non-conjugate diene terpolymer (sold by U.S. Rubber).
[b] Butyl rubber (sold by Polysar Limited, Sarnia).
[c] Liquid polybutenes (sold by Amoco Chemicals Corp.).
[d] Polyterpenic resin (sold by Schenectady Varnish Co.).

While the invention has been described by reference to particular embodiments thereof, it is intended that those embodiments be considered illustrative rather than restrictive and that the scope of the invention be defined by the appended claims.

What we claim and desire to secure by Letters Patent is:

1. Mastic compositions comprising an elastomeric copolymer of ethylene and propylene having a propylene content of from 25 to 75 mole percent and an intrinsic viscosity measured at 120° C. in xylene of between 0.1 and 0.6 l./g., a filler, and a mineral oil.

2. Mastic compositions according to claim 1, further comprising a drying oil, said mastic compositions being surface hardening.

3. Non-hardening mastic compositions comprising an elastomeric terpolymer of ethylene, propylene and a non-conjugated diene, having a propylene content of from 25 to 75 mole percent, a filler and a mineral oil.

4. Non-hardening mastic compositions according to oil are present in proportions defined by the area (AKLH) in the diagram of FIG. I.

11. Mastic compositions according to claim 2, in which the mineral oil and the drying oil are present in a weight ratio of the mineral oil to the drying oil of from 99/1 to 1/4, and in which said copolymer, said filler and said oils are present in proportions defined by the area (ABCDEHKI) of the diagram of FIG. II.

12. Mastic compositions according to claim 11, in which said ethylene-propylene copolymer has an intrinsic viscosity, measured at 120° C. in xylene, of from 0.1 to 0.3 l./g. and in which said copolymer, said filler and said oils are present in proportions defined by the area (ABCDE) of the diagram of FIG. II.

13. Mastic compositions according to claim 11, in which said ethylene-propylene copolymer has an intrinsic viscosity, measured at 120° C. in xylene, of from 0.3 to 0.5 l./g. and in which said copolymer, said filler and said oils are present in proportions defined by the area (AFGHI) of the diagram of FIG. II.

14. Mastic compositions according to claim 11, in which said ethylene-propylene copolymer has an intrinsic viscosity, measured at 120° C. in xylene, of from 0.5 to 0.6 l./g. and in which said copolymer, said filler and said oils are present in proportions defined by the area (IKLM) of the diagram of FIG. II.

15. Mastic compositions according to claim 3, in which said terpolymer, said filler, and said mineral oil are present in proportions defined by the area (ABCDEFG) of the diagram of FIG. III.

16. Mastic compositions according to claim 5, in which said terpolymer, said filler and said oils are present in proportions defined by the area (ABCDEFG) of the diagram of FIG. III.

17. Mastic compositions according to claim 13, in which the proportion of the propylene in the copolymer is from 30 to 50 mol percent.

18. Mastic compositions according to claim 16, in which the non-conjugated diene is a non-conjugated aliphatic diene.

19. Mastic compositions according to claim 18, in which the non-conjugated aliphatic diene is selected from the group consisting of pentadiene-1,4, hexadiene-1,4 and hexadiene-1,5.

20. Mastic compositions according to claim 16, in which the non-conjugated diene is a non-conjugated monocyclic diene.

21. Mastic compositions according to claim 20, in which the non-conjugated monocyclic diene is selected from the group consisting of 4-vinylcyclohexene, 1,3-divinyl-cyclohexane, cycloheptadiene-1,4 and cyclooctadiene-1,5.

22. Mastic compositions according to claim 16, in which the non-conjugated diene is a non-conjugated alicyclic diene.

23. Mastic compositions according to claims 22, in which the non-conjugated alicyclic diene is selected from the group consisting of dicyclopentadiene and norbornadiene.

24. Mastic compositions according to claim 5, in which the mineral oil is selected from the group consisting of aliphatic, naphthenic and aromatic mineral oils.

25. Mastic compositions according to claim 1, in which the filler material is selected from the group consisting of chalk, talc, kaolin, clay, carbon black and asbestos.

26. Mastic compositions according to claim 2, in which the drying oil is selected from the group consisting of linseed oil, cod liver oil and tall oil.

27. Mastic compositions according to claim 2, further comprising from 5 to 50 g. of a solvent per kg. of the composition exclusive of the solvent.

References Cited

UNITED STATES PATENTS

| | | | |
|---|---|---|---|
| 3,139,412 | 5/1964 | Sterling | 260—23 |
| 3,438,918 | 4/1969 | Arlt et al. | 260—22 |

DONALD E. CZAJA, Primary Examiner

D. J. BARRACK, Assistant Examiner

U.S. Cl. X.R.

260—23.5, 29.6, 29.7, 31.8, 33.4, 33.6, 41, 41.5